US012166531B2

(12) United States Patent
Huh et al.

(10) Patent No.: US 12,166,531 B2
(45) Date of Patent: Dec. 10, 2024

(54) OPTICAL TRANSMITTER BASED ON VESTIGIAL SIDEBAND MODULATION

(71) Applicant: ELECTRONICS AND TELECOMMUNICATIONS RESEARCH INSTITUTE, Daejeon (KR)

(72) Inventors: Joon Young Huh, Daejeon (KR); Sae Kyoung Kang, Daejeon (KR); Hun Sik Kang, Daejeon (KR); Sang Rok Moon, Daejeon (KR); Joon Ki Lee, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 152 days.

(21) Appl. No.: 18/096,638

(22) Filed: Jan. 13, 2023

(65) Prior Publication Data
US 2023/0261756 A1 Aug. 17, 2023

(30) Foreign Application Priority Data

Feb. 16, 2022 (KR) ........................ 10-2022-0020327

(51) Int. Cl.
H04B 10/00 (2013.01)
H04B 10/572 (2013.01)
(Continued)

(52) U.S. Cl.
CPC ........... *H04B 10/572* (2013.01); *H04B 10/58* (2013.01)

(58) Field of Classification Search
CPC ...... G02B 6/42; G02B 6/4204; G02B 6/4206; G02B 6/4214; G02B 6/4215; H04B 10/50; H04B 10/516; H04B 10/5165
See application file for complete search history.

(56) References Cited

U.S. PATENT DOCUMENTS 6,970,655 B2  11/2005  Ono et al.
9,008,134 B2   4/2015  Oh
(Continued)

FOREIGN PATENT DOCUMENTS

KR       10-0833254 B1     5/2008
KR    10-2009-0113216 A    10/2009
KR    10-2017-0053553 A     5/2017

OTHER PUBLICATIONS

Suen Xin Chew et al., "Silicon-on-Insulator Dual-Ring Notch Filter for Optical Sideband Suppression and Spectral Characterization", Journal of Lightwave Technology, vol. 34, No. 20, Oct. 15, 2016.

*Primary Examiner* — Daniel G Dobson
(74) *Attorney, Agent, or Firm* — LRK PATENT LAW FIRM

(57) ABSTRACT

Disclosed herein is an optical transmitter for generating a vestigial sideband (VSB) optical signal. The optical transmitter includes: a modulator configured based on a photonic integrated chip (PIC); an optical fiber block; and a lensed thin film filter implemented between the modulator configured based on the PIC and the optical fiber block. The PIC includes at least one grating coupler, and the lensed thin film filter is disposed so that an angle of an optical signal emitted from a first grating coupler of the PIC coincides with an angle of incident (AOI) of the lensed thin film filter to design the first grating coupler and the lensed thin film filter.

12 Claims, 7 Drawing Sheets

MOD: modulator
mPD: monitoring PD
TFF: thin film filter
WG: waveguide
GC: grating coupler

(51) Int. Cl.
 *H04B 10/58* (2013.01)
 *H04J 14/00* (2006.01)

(56) References Cited

U.S. PATENT DOCUMENTS

2018/0088378 A1  3/2018  Park et al.
2018/0329146 A1* 11/2018 Dannenberg ....... G02B 6/29367
2020/0092025 A1* 3/2020 Sahni .................... H04J 14/06

* cited by examiner

MOD: modulator
ROSA: Receiver optical sub-assembly
TIA: Trans-Impedance Amplifier
mPD: monitoring PD
PIC: photonic integrated chip
DSP: digital signal processing
VSB: vestigial side band
MCU: micro-control unit MOD: modulator
mPD: monitoring PD
TFF: thin film filter
WG: waveguide
GC: grating coupler

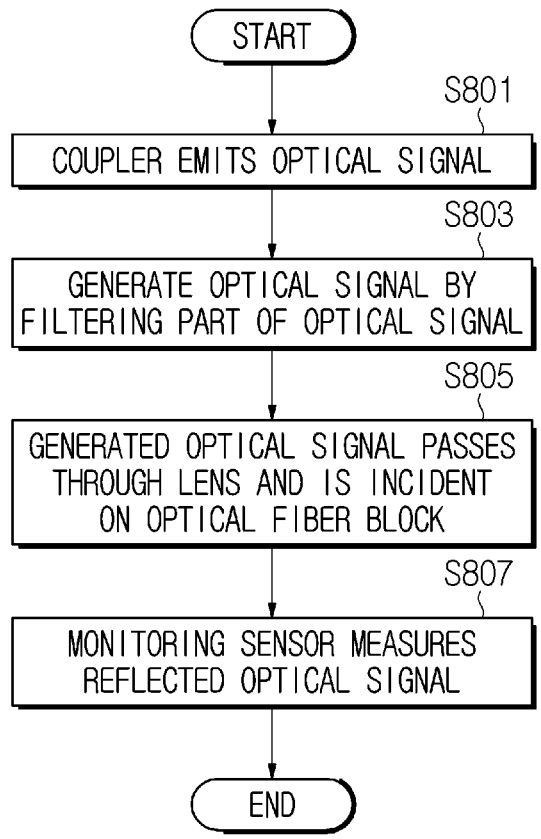
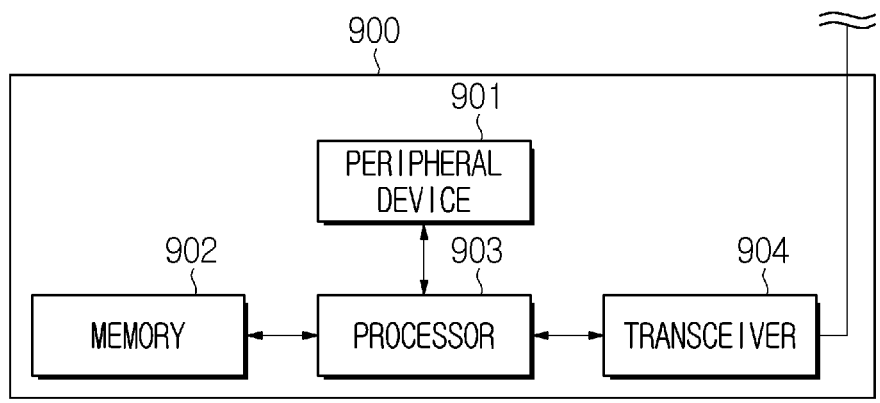

OPTICAL TRANSMITTER BASED ON VESTIGIAL SIDEBAND MODULATION

CROSS REFERENCE TO RELATED APPLICATION

The present application claims priority to Korean Patent Application No. 10-2022-0020327 filed Feb. 16, 2022, the entire content of which is incorporated herein for all purposes by this reference.

BACKGROUND OF THE INVENTION

1. Field of the Invention

The present disclosure relates to an optical transmitter, which is a core module in optical communication through optical communication.

2. Description of Related Art

In order to sufficiently accommodate rapidly increasing mobile traffic, it is necessary to develop a 6G ($6^{th}$ generation) communication network beyond current 5G (5th generation). However, in the case of 6G, since the arrival distance of radio waves is shorter and the radio transmittance in buildings is lowered, it is predicted that tera-class transmission/reception technology will become important in an indoor environment where 80% of mobile traffic occurs.

SUMMARY OF THE INVENTION

An object of the present disclosure is to propose an efficient PIC (photonic integrated chip) based vestigial sideband (VSB) optical transmitter structure.

The technical objects of the present disclosure are not limited to the above-mentioned technical objects, and other technical objects that are not mentioned will be clearly understood by those skilled in the art through the following descriptions.

According to the present disclosure, there is provided an optical transmitter for generating a vestigial sideband (VSB) optical signal, the optical transmitter comprising: a modulator configured based on a photonic integrated chip (PIC); an optical fiber block; and a lensed thin film filter implemented between the modulator configured based on the PIC and the optical fiber block. The PIC comprises at least one grating coupler, and the lensed thin film filter is disposed so that an angle of an optical signal emitted from a first grating coupler of the PIC coincides with an angle of incident (AOI) of the lensed thin film filter to design the first grating coupler and the lensed thin film filter.

According to the embodiment of the present disclosure in the optical transmitter, the VSB optical signal is generated after a modulated optical signal output from the first grating coupler is filtered through the lensed thin film filter.

According to the embodiment of the present disclosure in the optical transmitter, the VSB optical signal generated based on filtering passes through a lens and is incident on the optical fiber block.

According to the embodiment of the present disclosure in the optical transmitter, a part of a modulated optical signal output from the first grating coupler is reflected through the lensed thin film filter when the modulated optical signal is filtered through the lensed thin film filter and the reflected optical signal is applied to a second grating coupler of the PIC.

According to the embodiment of the present disclosure in the optical transmitter, the optical signal applied to the second grating coupler is measured by a first mPD.

According to the embodiment of the present disclosure in the optical transmitter, the VSB optical signal reflected from the optical fiber block is measured by a second mPD, and the VSB optical signal is optimized by controlling a wavelength of a light source based on the signals measured by the first mPD and the second mPD.

According to another embodiment of the present disclosure, there is provided an optical transmitter for generating a vestigial sideband (VSB) optical signal, the optical transmitter comprising: a modulator configured based on a photonic integrated chip (PIC); an optical fiber block; and a lensed thin film filter implemented between the modulator configured based on the PIC and the optical fiber block. The PIC comprises at least one edge coupler, and the lensed thin film filter is disposed so that an angle of an optical signal emitted from a first edge coupler of the PIC coincides with an angle of incident (AOI) of the lensed thin film filter to design the first edge coupler and the lensed thin film filter.

According to the embodiment of the present disclosure in the optical transmitter, the VSB optical signal is generated after a modulated optical signal output from the first edge coupler is filtered through the lensed thin film filter.

According to the embodiment of the present disclosure in the optical transmitter, the VSB optical signal generated based on filtering passes through a lens and is incident on the optical fiber block.

According to the embodiment of the present disclosure in the optical transmitter, a part of the modulated optical signal is reflected through the lensed thin film filter when a modulated optical signal output from the first edge coupler is filtered through the lensed thin film filter and the reflected optical signal is applied to a second edge coupler of the PIC.

According to the embodiment of the present disclosure in the optical transmitter, the optical signal applied to the second edge coupler is measured by a first mPD.

According to the embodiment of the present disclosure in the optical transmitter, the VSB optical signal reflected from the optical fiber block is measured by a second mPD, and the VSB optical signal is optimized by controlling a wavelength of a light source based on the signals measured by the first mPD and the second mPD.

The features briefly summarized above for this disclosure are only exemplary aspects of the detailed description of the disclosure which follow, and are not intended to limit the scope of the disclosure.

BRIEF DESCRIPTION OF THE DRAWINGS

The above and other objects, features and other advantages of the present invention will be more clearly understood from the following detailed description taken in conjunction with the accompanying drawings, in which:

FIG. 8 is a flowchart illustrating an example of an optical transmitter operation procedure according to the present disclosure; and FIG. 9 is a block diagram illustrating a device configuration according to the present disclosure.

DESCRIPTION OF THE PREFERRED EMBODIMENTS

Figure 1:
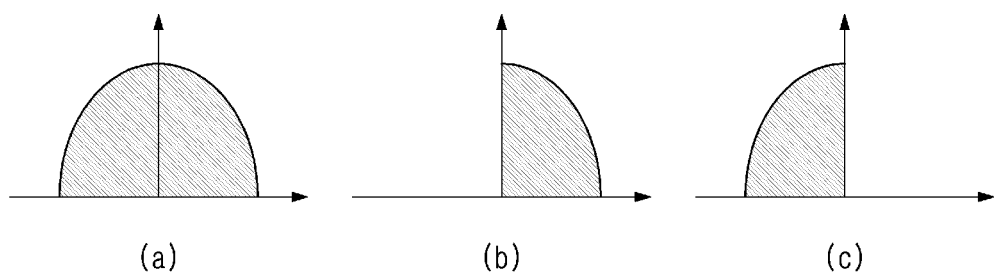
FIG. 1 is a diagram illustrating a spectrum of an optical signal.

Hereinafter, exemplary embodiments of the present disclosure will be described in detail with reference to the accompanying drawings so that those skilled in the art may easily implement the present disclosure. However, the present disclosure may be implemented in various different ways, and is not limited to the embodiments described therein.

In describing exemplary embodiments of the present disclosure, well-known functions or constructions will not be described in detail since they may unnecessarily obscure the understanding of the present disclosure. The same constituent elements in the drawings are denoted by the same reference numerals, and a repeated description of the same elements will be omitted.

In the present disclosure, when an element is simply referred to as being "connected to", "coupled to" or "linked to" another element, this may mean that an element is "directly connected to", "directly coupled to" or "directly linked to" another element or is connected to, coupled to or linked to another element with the other element intervening therebetween. In addition, when an element "includes" or "has" another element, this means that one element may further include another element without excluding another component unless specifically stated otherwise.

In the present disclosure, the terms first, second, etc. are only used to distinguish one element from another and do not limit the order or the degree of importance between the elements unless specifically mentioned. Accordingly, a first element in an embodiment could be termed a second element in another embodiment, and, similarly, a second element in an embodiment could be termed a first element in another embodiment, without departing from the scope of the present disclosure.

In the present disclosure, elements that are distinguished from each other are for clearly describing each feature, and do not necessarily mean that the elements are separated. That is, a plurality of elements may be integrated in one hardware or software unit, or one element may be distributed and formed in a plurality of hardware or software units. Therefore, even if not mentioned otherwise, such integrated or distributed embodiments are included in the scope of the present disclosure.

In the present disclosure, elements described in various embodiments do not necessarily mean essential elements, and some of them may be optional elements. Therefore, an embodiment composed of a subset of elements described in an embodiment is also included in the scope of the present disclosure. In addition, embodiments including other elements in addition to the elements described in the various embodiments are also included in the scope of the present disclosure.

The advantages and features of the present invention and the way of attaining them will become apparent with reference to embodiments described below in detail in conjunction with the accompanying drawings. Embodiments, however, may be embodied in many different forms and should not be constructed as being limited to example embodiments set forth herein. Rather, these embodiments are provided so that this disclosure will be complete and will fully convey the scope of the invention to those skilled in the art.

In the present disclosure, each of phrases such as "A or B", "at least one of A and B", "at least one of A or B", "A, B or C", "at least one of A, B and C", "at Each of the phrases such as "at least one of A, B or C" and "at least one of A, B, C or combination thereof" may include any one or all possible combinations of the items listed together in the corresponding one of the phrases.

In the present disclosure, expressions of location relations used in the present specification such as "upper", "lower", "left" and "right" are employed for the convenience of explanation, and in case drawings illustrated in the present specification are inversed, the location relations described in the specification may be inversely understood.

Hereinafter, embodiments of the present disclosure will be described with reference to the accompanying drawings.

It is necessary to develop high-speed optical communication infrastructure technology to establish a 6G ($6^{th}$ generation) indoor network for a smart office to improve productivity and convenience of modern people who stay indoors for a long time. C-band and O-band are representative wavelength bands mainly used in optical communication. Unlike O-band, C-band may use dozens of wavelengths, so it is very suitable for increasing transmission capacity. However, optical signals using C-band have disadvantages in that transmission speed and transmission distance may be limited due to chromatic dispersion existing in optical fibers. In particular, a direct reception optical transmission/reception technology that may be used when economic feasibility is important, such as an indoor network, may be more vulnerable to chromatic dispersion. To solve this problem, various methods are being studied, and, among them, a representative method is a single sideband (SSB) optical transmission/reception technology.

FIG. 1 is a diagram illustrating a spectrum of an optical signal. (a) of FIG. 1 shows a spectrum of a double sideband (DSB) optical signal. (b) of FIG. 1 shows a spectrum of an upper sideband (USB) optical signal. (c) of FIG. 1 shows a spectrum of a lower sideband (LSB) optical signal. In general, an optical signal has a symmetrical spectrum with respect to a carrier like DSB. The SSB optical transmission/reception technology is a method that uses only one part of the carrier, such as USB or LSB. This may reduce the bandwidth of the optical signal by half, thereby doubling the limited distance due to chromatic dispersion.

A method of implementing SSB optical transmission/reception technology is being studied in various ways. For example, there is a method of applying electrical signals, to which Hilbert transform is applied, to a dual-electrode Mach-Zehnder modulator, and a method of removing a USB or LSB signal from an optically modulated signal through an optical filter. In the case of the method of removing the USB or LSB signal from the optically modulated signal through the optical filter, some removed band may remain depending on performance of the filter. Therefore, this band is also defined as a vestigial sideband (VSB). The VSB optical transmission/reception technology has an advantage in that it does not require an expensive electronic device compared to other SSB generation technologies. The present disclosure proposes a structure of an efficient VSB optical transmitter based on a photonic integrated chip (PIC), such as silicon photonics, which is currently being actively studied.

Figure 2:
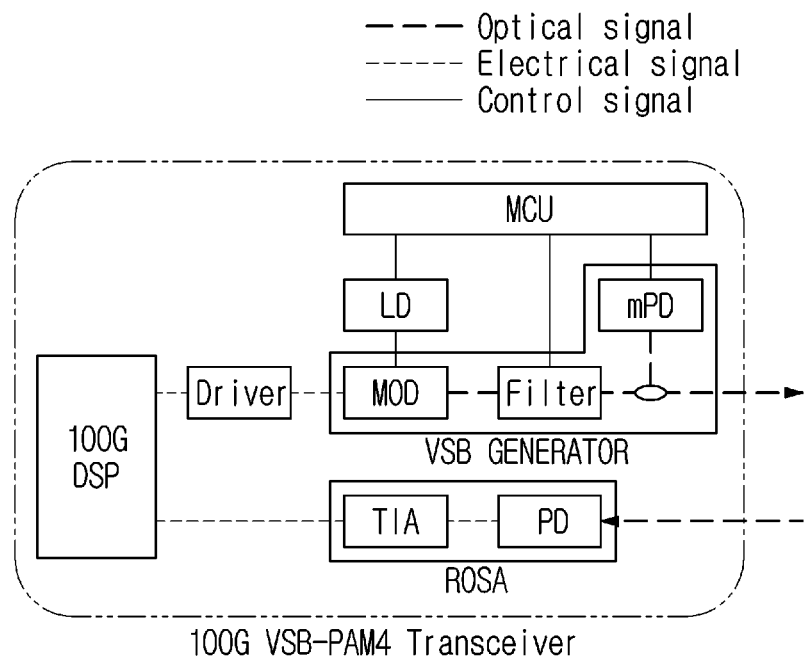
FIG. 2 shows an example of an optical transmitter structure according to the present disclosure.

FIG. 2 shows an example of an optical transmitter structure according to the present disclosure. Specifically, FIG. 2 shows the structure of a 100G VSB PAM-4 optical transmitter. When an optical filter is used to generate a VSB signal, the wavelength of the optical signal and the condition of the center wavelength of the filter may be important. For stable driving of the optical transmitter, it may be important to monitor a modulated optical signal and to perform control so that a high-performance VSB optical signal is continuously generated.

In order to use only PIC technology when implementing a VSB optical transmitter, a filter is implemented using a micro ring resonator and a mach-zehnder interferometer in a PIC. However, since they are greatly affected by the environment such as ambient temperature, precise control is required. In addition, their filtering performance is relatively poor compared to a basic bulk optics-based filter. As a result, the quality of the VSB optical signal is deteriorated. The present disclosure proposes a VSB optical transmitter which is a hybrid of a PIC-based modulator and a lensed thin film filter (bulk optics).

Figure 3:
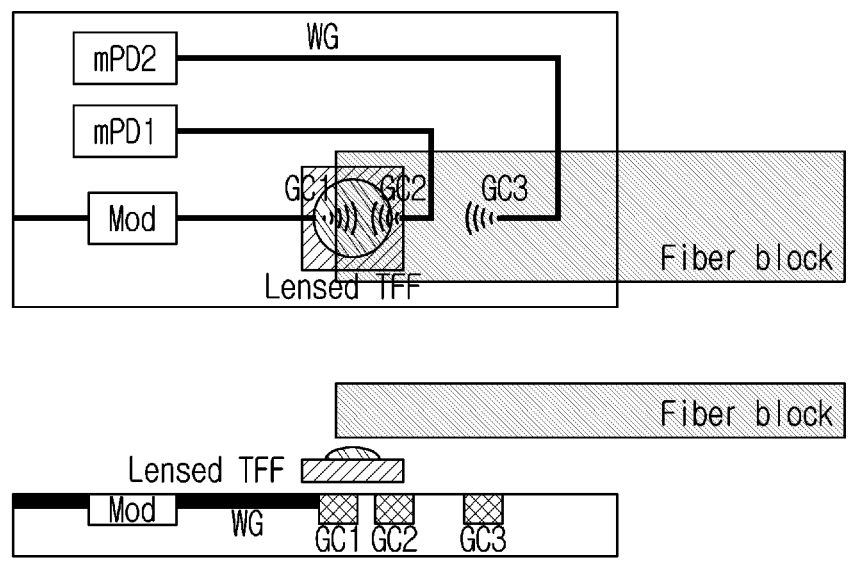
FIG. 3 shows an example of a VSB optical transmitter structure according to the present disclosure.

FIG. 3 shows an example of a VSB optical transmitter structure according to the present disclosure. Specifically, FIG. 3 shows an example of a structure of a VSB optical transmitter based on a grating coupler (GC) according to the present disclosure. FIG. 3 shows an example of the VSB generator of FIG. 2. Referring to FIG. 3, the output of the PIC in which the modulator is implemented is composed of grating couplers (GCs). The SB optical transmitter may be implemented by disposing a lensed thin film filter between the grating coupler of the PIC and the optical fiber block when they are coupled. The optical fiber block is a tool for coupling a grating coupler and a fiber, and may be implemented in various ways such as a 45 degree polished fiber, a curved fiber, and the like. In the proposed structure, it is assumed that a light source is outside the PIC. However, the light source may be disposed in the PIC and is not limited to the above-mentioned assumption. mPDs may be disposed within the PIC in relation to a monitoring signal for controlling the wavelength of the light source used. The optical transmitter may control the wavelength of the light source by using the signals measured by the mPD.

Figure 4:
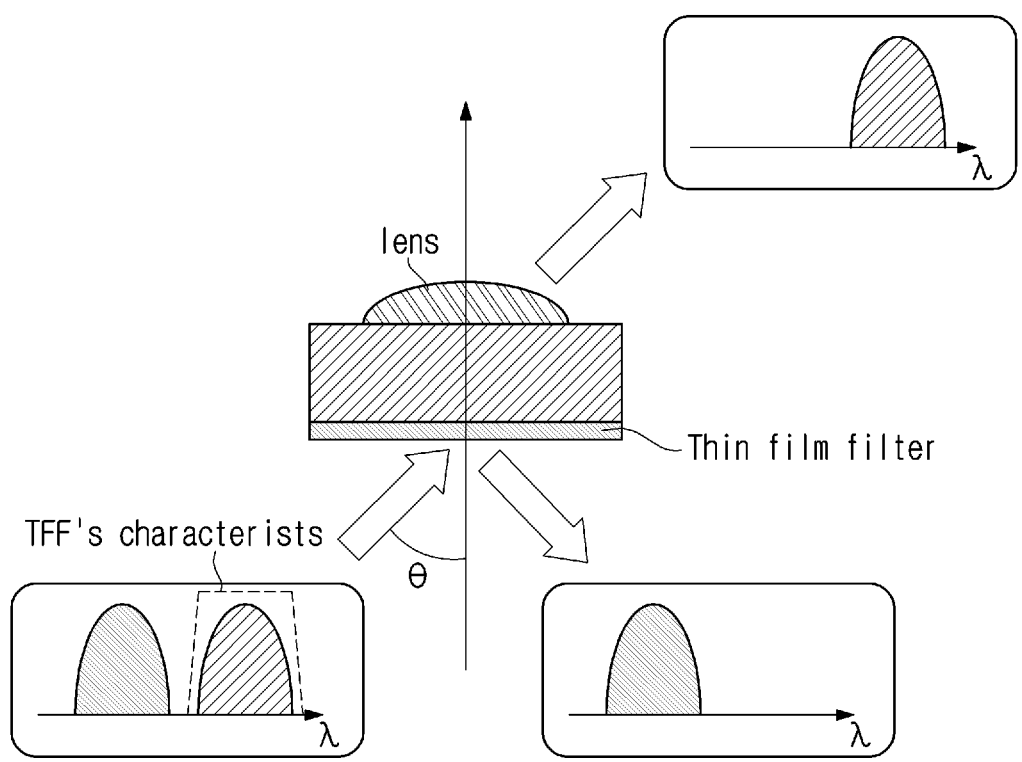
FIG. 4 shows an example of a lensed thin film filter according to the present disclosure.

FIG. 4 shows an example of a lensed thin film filter according to the present disclosure. Specifically, FIG. 4 shows a conceptual diagram of a lensed thin film filter (lensed TFF) utilized in a transmitter structure according to the present disclosure. Referring to FIG. 4, when an optical signal is incident according to a designed AOI (Angle of Incident) of a thin film filter (TFF), some optical signals suitable for filter response characteristics may pass. The passed optical signal may be focused by a lens and output. On the other hand, signals that does not pass through the TFF may be reflected downward.

Figure 5:
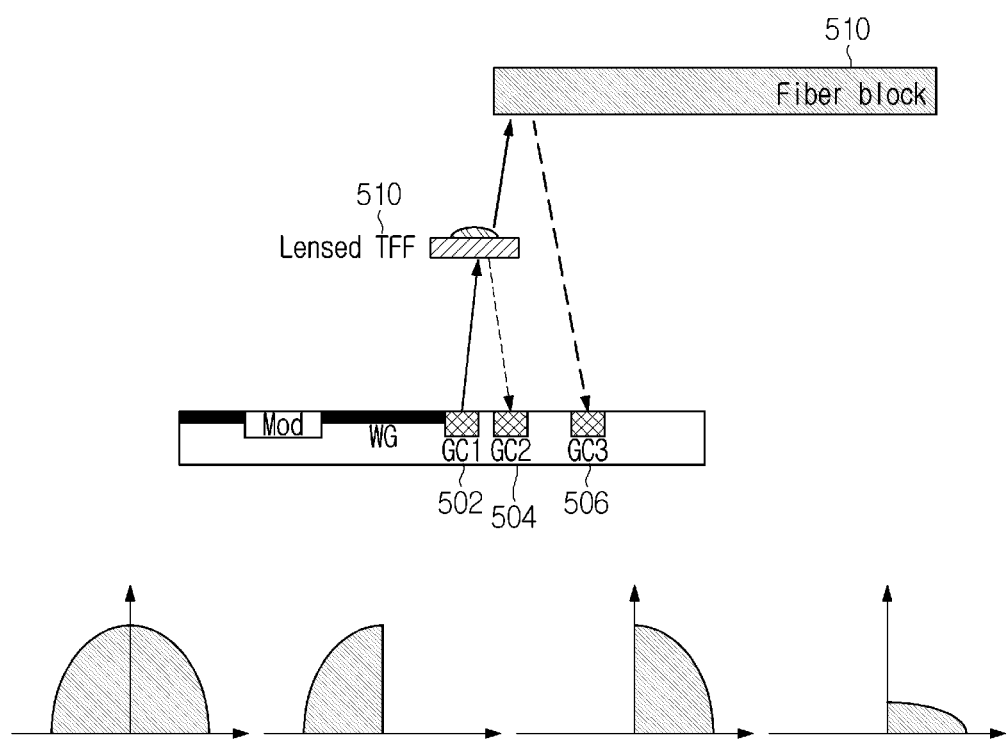
FIG. 5 shows an example of an optical transmitter operation according to the present disclosure.

FIG. 5 shows an example of an optical transmitter operation according to the present disclosure. Specifically, FIG. 5 shows a conceptual diagram of an operation of a PIC-based optical transmitter using a grating coupler according to the present disclosure. The grating coupler and the TFF, may be designed so that the angle of the optical signal emitted from the grating coupler coincides with the AOI of the TFF. In addition, the TFF, may be disposed according to the design. Then, a part of the modulated optical signal output from a GC1 502 is filtered based on the characteristics of the filter, so that a VSB optical signal may be generated. The generated optical signal passes through the lens and is incident on an optical fiber block 510. The optical signal filtered by the lensed TFF 508 and reflected therefrom may be applied to a GC2 504 of a PIC and measured by the mPD1. The VSB optical signal reflected from the optical fiber block 510 may be applied to a GC3 506 and measured by the mPD2. The device may optimize the VSB optical signal by controlling the wavelength of the light source through the measured signal.

Figure 6:
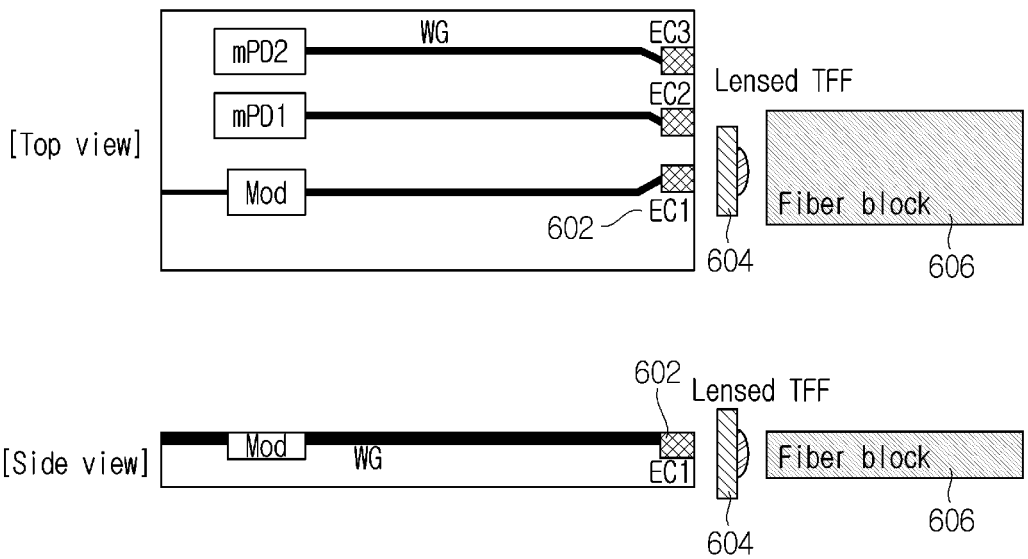
FIG. 6 shows an example of an optical transmitter according to the present disclosure.

FIG. 6 shows an example of an optical transmitter according to the present disclosure. FIG. 6 shows an example of the structure of an edge coupler-based VSB optical transmitter according to the present disclosure. Referring to FIG. 6, the lensed TFF may also be applied to a PIC using an edge coupler. A lensed TFF 604 may be disposed between an edge coupler1 (EC1) 602 and an optical fiber block 606. In this case, it may be designed such that the emission angle of the optical signal emitted from the EC1 602 is equal to the AOI of the TFF in the PIC. As another example, by tilting the TFF to be suitable for the AOI value, the angle at which the optical signal is incident on the TFF may coincide with the AOI of the TFF.

Figure 7:
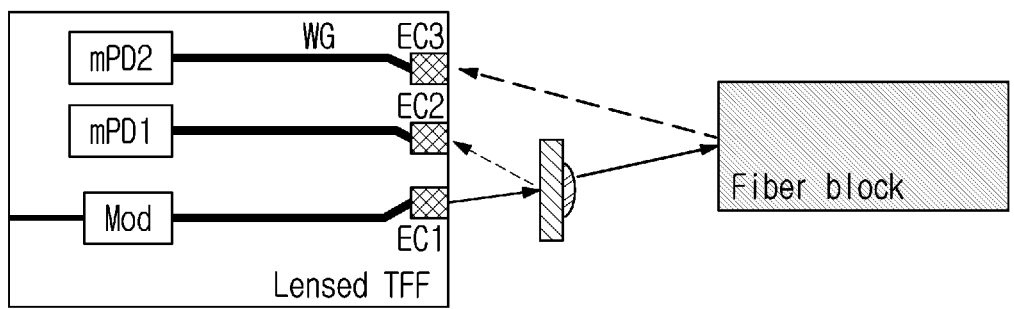
FIG. 7 shows an example of an optical transmitter operation according to the present disclosure.

FIG. 7 shows an example of an optical transmitter operation according to the present disclosure. Specifically, FIG. 7 shows a conceptual diagram of an operation of a PIC-based optical transmitter using an edge coupler according to the present disclosure. When the angle of the tilted optical signal emitted from the EC1 and the AOI of the TFF coincide with each other, a part of the modulated optical signal output from C1 is filtered based on the characteristics of the filter to generate a VSB optical signal. The generated optical signal may pass through the lens and be incident on the optical fiber block. At this time, the optical signal reflected from the lensed TFF may be applied to an EC2 of the PIC and measured by the mPD1. The VSB optical signal reflected from the optical fiber block may be applied to an EC3 and measured by the mPD2. The optical transmitter may optimize the VSB optical signal by controlling the wavelength of the light source based on the measured signal.

The present disclosure proposes a method of implementing a PIC-based VSB optical transmitter using a lensed TFF. According to the present disclosure, it is possible to generate a more stable and efficient VSB optical signal by utilizing a TFF having relatively excellent filter characteristics and independent of the surrounding environment. In addition, the optical transmitter according to the present disclosure proposes a method of controlling a monitoring signal for optimizing an optical signal by measuring only reflected optical signals generated in the proposed optical transmitter structure without additional optical loss that may occur in a VSB coupler, etc. The optical transmitter structure proposed according to the present disclosure is a structure capable of realizing a stable high-efficiency VSB optical transmitter.

FIG. 8 is a flowchart illustrating an example of an optical transmitter operation procedure according to the present disclosure. In step S801, a coupler may emit an optical signal. The coupler may be designed so that the angle of the emitted light signal coincides with the AOI of the lensed thin film filter. In step S803, a part of the output optical signal may be filtered to generate a VSB optical signal. In step S805, the generated optical signal may pass through the lens and be incident on the optical fiber block. The optical signal may also be reflected from the optical fiber block. In step S807, the monitoring sensor may measure the reflected optical signal. For example, the optical signal reflected from the lensed thin film filter may be measured by a first monitoring sensor. The optical signal reflected from the optical fiber block may be measured by a second monitoring sensor. The monitoring sensor may control the wavelength of the light source through the measured signal. The optical transmitter may optimize the VCB optical signal by controlling the wavelength of the light source.

FIG. 9 is a block diagram illustrating a device configuration according to the present disclosure. Referring to FIG. 9, the device 900 may include a memory 902, a processor 903, a transceiver 904, and a peripheral device 901. In addition, as an example, the device may further include other components, and is not limited to the above-described embodiment. In this case, as an example, the device 900 may communicate with the peripheral device 901 based on an optical signal based on an optical transceiver. For example, the transceiver 904 of the device 900 may generate an optical signal through the above-described optical transmitter, and the specific method is as described above. Also, as an example, the transceiver 904 of the device 900 may receive an optical signal transmitted from another device, and is not limited to a specific embodiment. Also, as an example, the processor 903 of the device 900 may control the transceiver 904 and other entities described above, and the memory 902 may store related information, but is limited to a specific embodiment.

It may be an electric field cancer treatment device. More specifically, the device 900 of FIG. 9 may be exemplary hardware/software that presents an optical transmitter based on a vestigial sideband modulation technique. In this case, as an example, the memory 902 may be a non-removable memory or a removable memory. As an example, the peripheral device 901 may include an electric field generator, an electric field strength sensor, a ferroelectric electrode, and the like. In addition, the peripheral device 901 is not limited to the above-described embodiment. Also, as an example, the above-described device 900 may include a communication circuit like the transceiver 904, and may communicate with an external device based thereon.

Also, as an example, the processor 903 may include at least one of a general-purpose processor, a digital signal processor (DSP), a DSP core, a controller, a microcontroller or one or more microprocessors associated with application specific integrated circuits (ASICs), field programmable gate array (FPGA) circuits, any other tangible integrated circuits (ICs) and a state machine. That is, it may be a hardware/software component for controlling the above-described device. At this time, the processor 903 may execute computer-executable instructions stored in the memory 902 to perform various essential functions of the node. For example, the processor 903 may control at least one of signal coding, data processing, power control, input/output processing, and communication operations. Also, the processor 903 may control a physical layer, a MAC layer, and an application layer. Also, as an example, the processor 903 may perform authentication and security procedures at an access layer and/or an application layer, and the like, and is not limited to the above-described embodiment.

The various embodiments of the present disclosure are not intended to list all possible combinations but are intended to illustrate representative aspects of the present disclosure, and the details described in various embodiments may be applied independently or in combination of two or more.

According to an embodiment of the present disclosure, a photonic integrated chip (PIC)-based vestigial sideband (VSB)-based optical transmitter may be implemented.

According to the present disclosure, it is possible to generate a stable and efficient VSB optical signal.

According to the present disclosure, it is possible to measure and control only reflected optical signals generated in an optical transmitter structure without additional optical loss.

Effects obtained in the present disclosure are not limited to the above-mentioned effects, and other effects not mentioned above may be clearly understood by those skilled in the art from the following description.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some of the steps.

The various embodiments of the present disclosure are not a list of all possible combinations and are intended to describe representative aspects of the present disclosure, and the matters described in the various embodiments may be applied independently or in combination of two or more.

In addition, various embodiments of the present disclosure may be implemented in hardware, firmware, software, or a combination thereof. In the case of implementing the present invention by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

What is claimed is:

1. An optical transmitter for generating a vestigial sideband (VSB) optical signal, the optical transmitter comprising:
   a modulator configured based on a photonic integrated chip (PIC);
   an optical fiber block; and
   a lensed thin film filter implemented between the modulator configured based on the PIC and the optical fiber block,
   wherein the PIC comprises at least one grating coupler, and
   the lensed thin film filter is disposed so that an angle of an optical signal emitted from a first grating coupler of the PIC coincides with an angle of incident (AOI) of the lensed thin film filter to design the first grating coupler and the lensed thin film filter.

2. The optical transmitter of claim 1, wherein the VSB optical signal is generated after a modulated optical signal output from the first grating coupler is filtered through the lensed thin film filter.

3. The optical transmitter of claim 2, wherein the VSB optical signal generated based on filtering passes through a lens and is incident on the optical fiber block.

4. The optical transmitter of claim 3, wherein a part of a modulated optical signal output from the first grating coupler is reflected through the lensed thin film filter when the modulated optical signal is filtered through the lensed thin film filter and the reflected optical signal is applied to a second grating coupler of the PIC.

5. The optical transmitter of claim 4, wherein the optical signal applied to the second grating coupler is measured by a first mPD.

6. The optical transmitter of claim 5, wherein:
the VSB optical signal reflected from the optical fiber block is measured by a second mPD, and
the VSB optical signal is optimized by controlling a wavelength of a light source based on the signals measured by the first mPD and the second mPD.

7. An optical transmitter for generating a vestigial sideband (VSB) optical signal, the optical transmitter comprising:
a modulator configured based on a photonic integrated chip (PIC);
an optical fiber block; and
a lensed thin film filter implemented between the modulator configured based on the PIC and the optical fiber block,
wherein the PIC comprises at least one edge coupler, and
the lensed thin film filter is disposed so that an angle of an optical signal emitted from a first edge coupler of the PIC coincides with an angle of incident (AOI) of the lensed thin film filter to design the first edge coupler and the lensed thin film filter.

8. The optical transmitter of claim 7, wherein the VSB optical signal is generated after a modulated optical signal output from the first edge coupler is filtered through the lensed thin film filter.

9. The optical transmitter of claim 8, wherein the VSB optical signal generated based on filtering passes through a lens and is incident on the optical fiber block.

10. The optical transmitter of claim 9, wherein a part of the modulated optical signal is reflected through the lensed thin film filter when a modulated optical signal output from the first edge coupler is filtered through the lensed thin film filter and the reflected optical signal is applied to a second edge coupler of the PIC.

11. The optical transmitter of claim 10, wherein the optical signal applied to the second edge coupler is measured by a first mPD.

12. The optical transmitter of claim 11, wherein:
the VSB optical signal reflected from the optical fiber block is measured by a second mPD, and
the VSB optical signal is optimized by controlling a wavelength of a light source based on the signals measured by the first mPD and the second mPD.

* * * * *